United States Patent [19]

Matsumoto et al.

[11] Patent Number: 5,032,643
[45] Date of Patent: Jul. 16, 1991

[54] PROCESS FOR PRODUCING POLYORGANOSILOXANES

[75] Inventors: Makoto Matsumoto; Junichiro Watanabe; Akitsugu Kurita; Yuichi Funahashi, all of Ohta, Japan

[73] Assignee: Toshiba Silicone Co., Ltd., Japan

[21] Appl. No.: 434,143

[22] Filed: Nov. 8, 1989

[30] Foreign Application Priority Data

Nov. 30, 1988 [JP] Japan .................. 63-302704

[51] Int. Cl.⁵ .......................................... C08L 83/00
[52] U.S. Cl. ........................................ 524/837; 528/23
[58] Field of Search .......................... 528/23; 524/837

[56] References Cited

U.S. PATENT DOCUMENTS 3,294,725 12/1966 Findlay et al. ..................... 528/23
3,360,491 12/1967 Axon ..................................... 528/23

Primary Examiner—Melvyn I. Marquis

[57] ABSTRACT

There is disclosed a process for producing polyorganosiloxanes, comprising that an organosiloxane having a structural unit represented by the following general formula:

$$R^1_n SiO_{\frac{4-n}{2}}$$

(in which $R^1$ represents a substituted or unsubstituted monovalent organic group; and n represents an integer of 0 tp 3) is subjected to emulsion polymerization in an aqueous medium in the presence of an organic sulfonic acid and a trihalogenated acetic acid.

5 Claims, No Drawings

PROCESS FOR PRODUCING POLYORGANOSILOXANES

The present application claims the priority of Japanese Patent Application Serial No. 63-302,704 filed on Nov. 30, 1988.

FIELD OF THE INVENTION

The present invention relates to a process for producing polyorganosiloxanes by emulsion polymerization.

BACKGROUND OF THE INVENTION

Silicone emulsions have been used in various fields not only as a protective material for home use products, travel goods, ships or automobile parts made of polyvinyl chlorides, or the like, but also as a glazing agent for improving the appearance of those goods.

A diluted silicone emulsion can be used as a material for treating textiles, interior decorations, cloth-coverings, or the like. It is possible, by treatment with such a silicone emulsion, to impart excellent water-resistant and dust-proof properties to textiles and the like.

In addition, much attention has been directed to the use of silicone emulsions in a variety of cosmetics, such as hair conditioners, make-ups, anti-sunburn lotions, and the like.

Because of the stability of micelles and fine particle size, it can be advantageous to produce silicone emulsions by means of emulsion polymerization.

Emulsion polymerization is a process in which a low molecular organosiloxane is dispersed into an aqueous medium by use of an emulsifier and then polymerized up to a desired polymerization degree in the presence of a polymerization catalyst, as is described, e.g., in U.S. Pat. No. 2,891,920.

Upon such emulsion polymerization, there is usually used an organic sulfonic acid ester which functions not only as an emulsifier but also as a catalyst, such as those described in U.S. Pat. Nos. 3,360,491 and 3,294,725, in particular dodecylbenzene sulfonates, because of their ease of production and cost.

However, silicone emulsions produced in accordance with such an emulsion polymerization process suffer from the disadvantage that they, owing to sulfur atoms remaining therein, are easily colored yellow when exposed to ultraviolet rays.

For the purpose of preventing such coloring, it has been attempted to reduce the quantity of organic sulfonates to be used as an emulsifier catalyst and to reduce the quantity of sulfur remaining in the resulting silicone emulsions.

However, a simple reduction of the amount of organic sulfonates used results in a lowering in the conversion rate of low molecular organosiloxanes and a lowering in the polymerization degree of polyorganosiloxanes obtained.

SUMMARY OF THE INVENTION

It is therefore an object of the present invention to provide a process for producing polyorganosiloxanes having a high polymerization degree and free from coloring caused by ultraviolet rays.

There is provided by the present invention a process for producing polyorganosiloxanes, which comprises that an organosiloxane having a structural unit represented by the following general formula:

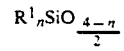

$$R^1_n SiO_{\frac{4-n}{2}} \quad (1)$$

(in which $R^1$ represents a substituted or unsubstituted monovalent organic group; and n represents an integer of 0 to 3) is subjected to emulsion polymerization in an aqueous medium in the presence of an organic sulfonic acid and a trihalogenated acetic acid.

In the emulsion polymerization according to the present invention, the organic sulfonic acid functions not only as an emulsifier but also as a catalyst, and the trihalogenated acetic acid serves to reduce the quantity of organic sulfonic acids to be used to a lowest where a stable emulsion can be formed and the emulsion polymerization can proceed smoothly. By the presence of a trihalogenated acetic acid, the efficiency of the polymerization can be improved and the polycondensation reaction can be made to proceed to a sufficient degree even when the organic sulfonic acid is used in a minimum quantity.

DETAILED DESCRIPTION OF THE INVENTION

As examples of organic sulfonic acids to be used in the process of the present invention, mention may be made of benzenesulfonic acids substituted with an aliphatic group, naphthalenesulfonic acids substituted with an aliphatic group, aliphatic sulfonic acids, silylalkylsulfonic acids and diphenyl ether sulfonic acids substituted with an aliphatic group, the aliphatic groups contained therein having a carbon chain of 6 to 18 carbon atoms. Of these compounds, benzene sulfonic acids substituted with an aliphatic acid are preferable. Dodecylbenzenesulfonic acid is particularly preferable.

As examples of trihalogenated acetic acids to be used in the invention, mention may be made of trifluoroacetic acid, trichloroacetic acid and tribromoacetic acid. The use of trifluoroacetic acid or trichloroacetic acid is preferable.

In the present invention are used organosiloxanes having a structural unit represented by the following general formula:

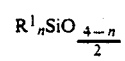

$$R^1_n SiO_{\frac{4-n}{2}} \quad (1)$$

(in which $R^1$ represents a substituted or unsubstituted monovalent organic group; and n represents an integer of 0 to 3). The structure of the organosiloxanes can be either straight, branched or cyclic. Organosiloxanes having a cyclic structure are preferable.

As examples of substituted or unsubstituted organic groups which can be contained in the organosiloxanes, mention may be made of hydrocarbon groups, such as methyl, ethyl, propyl, vinyl and phenyl, and their derivatives substituted with one or more halogen atoms or cyano groups.

Specific examples of such organosiloxanes include cyclic compounds, such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetravinylcyclotetrasiloxane and tetramethyltetraphenylcyclotetrasiloxane. It is also possible to use straight or branched chain organosiloxanes.

The organosiloxanes can be used either individually or in the form of a mixture of two or more of them.

It is particularly preferable to use a mixture of hexamethylcyclotrisiloxane and octamethylcyclotetrasiloxane.

The use of such a mixture makes it possible to further reduce the quantity of organic sulfonic acids to be used. This can be advantageous for the prevention of the undesirable coloring.

In the mixture, there can be used hexamethylcyclotrisiloxane in an amount of 5 to 100 parts by weight, preferably 10 to 50 parts by weight, per 100 parts by weight of octamethylcyclotetrasiloxane.

In the case where the organosiloxane represented by the above general formula (I) is a straight or branched chain, the terminals of the molecule can be terminated with such groups as hydroxyl, alkoxy, trimethylsilyl, dimethylvinylsilyl, methylphenylvinylsilyl, or the like.

As mentioned above, in the process of the present invention, organosiloxanes such as those mentioned above are subjected to emulsion polymerization in the presence of an organic sulfonic acid and a trihalogenated acetic acid.

In the first place, an organic sulfonic acid and a trihalogenated acetic acid are dissolved in water, and organosiloxanes are added thereto with stirring by using, e.g., a homogenizer to effect preliminary emulsification.

Subsequently, the mixture is homogenized by using, e.g., a pressure homogenizer and then subjected to heating and cooling to effect polycondensation.

Thereafter, the polycondensation product is neutralized with an alkali to give a polyorganosiloxane-containing silicone emulsion according to the invention.

The organic sulfonic acid functions as a emulsifier and, at the same time, as a catalyst for the emulsion polymerization. It is necessary to use an organic sulfonic acid at least in an amount where a stable emulsion can be formed and the emulsion polymerization can proceed smoothly.

In general, an organic sulfonic acid is used in an amount of 0.1 to 5% by weight, preferably 0.3 to 3% by weight, based on the weight of organosiloxanes.

Trihalogenated acetic acids are used in an amount of from about twice to about half, preferably about the same, of that of organic sulfonic acids used.

In the above reaction, water is used in general in an amount of 100 to 500 parts by weight, preferably 200 to 400 parts by weight, per 100 parts by weight of organosiloxanes.

In usual cases, the heating in the above polycondensation is conducted at a temperature of 60° to 90° C., and the cooling is effected at a temperature of 0° to 30° C. Examples of alkaline substances usable for the neutralization include ammonia, triethanolamine, sodium hydroxide, potassium hydroxide, sodium carbonate, sodium hydrogencarbonate, and the like.

In the process of the present invention for producing polyorganosiloxanes, there can be additionally used a cross-linking agent, so as to improve the durability of a protective coating formed from an emulsion of polyorganosiloxanes according to the invention.

As examples of usable cross-linking agents, mention may be made of tri-functional compounds, such as methyltrimethoxysilane, phenyltrimethoxysilane, ethyltriethoxysilane, etc., and tetra-functional compounds, such as tetraethoxysilane, etc.

Such a cross-linking agent is used in general in an amount of 10% by weight or less, preferably 5% by weight or less, based on the weight of organosiloxanes.

In the process of the present invention for producing polyorganosiloxanes, a trihalogenated acetic acid is allowed to be present upon the emulsion polymerization of organosiloxanes in which an organic sulfonic acid is used as an emulsifier catalyst. This enables the polycondensation to proceed to a satisfactorily high polymerization degree even when the organic sulfonic acid is used in an amount less than required in ordinary polycondensation of organosiloxanes.

The present invention will further be illustrated by examples. In the examples, parts and per cents are based on weight unless otherwise specifically noted.

EXAMPLE 1

In 300 parts of distilled water were dissolved 0.5 parts of dodecylbenzenesulfonic acid and 0.3 parts of trichloroacetic acid. To this solution was added 100 parts of octamethylcyclotetrasiloxane. The mixture was stirred for 3 minutes with a homogenizing mixer to effect preliminary emulsification, and then it was emulsified by using a pressure homogenizer.

The emulsified mixture was placed in a separable flask equipped with a condenser, a nitrogen-introducing tube and a stirrer. While being stirred, the mixture was heated at 85° C. for 5 hours and then allowed to stand at room temperature for 24 hours to complete polycondensation.

Thereafter, its pH was adjusted to 6.0 by the use of an aqueous 10% sodium carbonate solution.

The thus obtained polyorganosiloxane had a polymerization rate of 82%. Its polymerization degree, reduced to polystyrene, was 2,700.

With the thus prepared emulsion, a film of polyorganosiloxane was formed on an aluminum plate. The film was exposed for 1 hour to ultraviolet rays from a high pressure mercury lamp of 80 W/cm positioned at a distance of 20 cm. The polyorganosiloxane film was observed with naked eyes. However, no significant yellow-coloring was observed.

EXAMPLE 2

A polyorganosiloxane was produced under the same conditions as in Example 1, except that 100 parts of octamethylcyclotetrasiloxane, 0.3 parts of dodecylbenzenesulfonic acid and 0.2 parts of trifluoroacetic acid were used.

The polyorganosiloxane obtained had a polymerization rate of 64%, and its polymerization degree, reduced to polystyrene, was 890.

The coloring of the polyorganosiloxane was examined against exposure to ultraviolet rays under the same conditions as in Example 1. No significant yellow-coloring was observed.

EXAMPLE 3

A polyorganosiloxane was produced under the same conditions as in Example 1, except that a mixture of 70 parts of octamethylcyclotetrasiloxane and 30 parts of hexamethylcyclotrisiloxane was used in place of the organosiloxane.

The polyorganosiloxane obtained had a polymerization rate of 83%; and its polymerization degree, reduced to polystyrene, was 3,700.

The coloring of the polyorganosiloxane was examined against exposure to ultraviolet rays under the same conditions as in Example 1. No significant yellow-coloring was observed.

EXAMPLE 4

A polyorganosiloxane was produced under the same conditions as in Example 2, except that a mixture of 70 parts of octamethylcyclotetrasiloxane and 30 parts of hexamethylcyclotrisiloxane was used as organosiloxanes.

The polyorganosiloxane obtained had a polymerization rate of 68%, and its polymerization degree, reduced to polystyrene, was 2,200.

The coloring of the polyorganosiloxane against exposure to ultraviolet rays was examined under the same conditions in Example 1. No significant yellow-coloring was observed.

EXAMPLE 5

A polyorganosiloxane was produced under the same conditions as in Example 1, except that 70 parts of octamethylcyclotetrasiloxane and 30 parts of hexamethylcyclotrisiloxane was used in place of the organosiloxane, and dodecylbenzenesulfonic acid and trichloroacetic acid were used in an amount of 0.2 parts and 0.3 parts, respectively.

The polyorganosiloxane obtained had a polymerization rate of 79%, and its polymerization degree, reduced to polystyrene, was 2,500.

The polyorganosiloxane exhibited the most excellent coloring-resistant properties among the samples prepared in the examples and showed almost no yellow-coloring.

The results of the above examples are shown in Table 1.

COMPARISON EXAMPLES 1 to 4

Polyorganosiloxanes were produced under the same conditions as in Example 1, except that trihalogenated acetic acids were not used at all and that dodecylbenzenesulfonic acid was charged in quantities shown in Table 1.

Polymerization rates and polymerization degrees of the polyorganosiloxanes obtained were determined, and their resistance to yellow coloring were examined in the same manner as in Example 1.

Results obtained are also shown in Table 1.

TABLE 1

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| Composition Charged | | | | | | | | | |
| Octamethylcyclotetrasiloxane | 100 | 100 | 70 | 70 | 70 | 100 | 100 | 100 | 100 |
| Hexamethylcyclotrisiloxane | — | — | 30 | 30 | 30 | — | — | — | — |
| Trichloroacetic Acid | 0.3 | — | 0.3 | — | 0.3 | — | — | — | — |
| Trifluoroacetic Acid | — | 0.2 | — | 0.2 | — | — | — | — | — |
| Dodecylbenzenesulfonic Acid | 0.5 | 0.3 | 0.5 | 0.3 | 0.2 | 0.3 | 0.5 | 1.0 | 2.0 |
| Distilled Water | 300 | 300 | 300 | 300 | 300 | 300 | 300 | 300 | 300 |
| Polymerization Rate (%) | 82 | 64 | 83 | 68 | 79 | 27 | 71 | 90 | 88 |
| Polymerization Degree *1 | 2700 | 890 | 3700 | 2200 | 2500 | 230 | 1100 | 3600 | 4500 |
| Resistance to Yellow-Coloring | Good | Good | Good | Good | Best | Good | Good | Not Good | Not Good |

*1: Reduced to polystyrene

It would be apparent from the above results that, when the quantity of the organic sulfonic acid is simply reduced, there is resulted undesirable lowering in both polymerization rate and polymerization degree, although the yellow-coloring can be prevented.

On the other hand, when trifluoroacetic acid or trichloroacetic acid is additionally used, both polymerization rate and polymerization degree could be improved even if dodecylbenzenesulfonic acid is used in the same quantity.

In addition, the polymerization degree of polyorganosiloxanes can be further improved by using a mixture of octamethylcyclotetrasiloxane and hexamethylcyclotrisiloxane.

As shown hereinabove, upon emulsion polymerization of organosiloxanes in a reaction system employing an organic sulfonic acid in a decreased quantity, the presence of a trihalogenated acetic acid enables to obtain polyorganosiloxanes having a high polymerization degree even in the case where an organic sulfonic acid is used in a small quantity, and at the same time the yellow-coloring of polyorganosiloxanes obtained can be prevented through the reduction in the amount of organic sulfonic acids used.

In the process of the present invention for producing polyorganosiloxanes, the polycondensation, or emulsion polymerization of organosiloxanes, can proceed up to a high polymerization degree due to the presence of a trihalogenated acetic acid, even in the case where an organic sulfonic acid is used in an amount less than required in ordinary polycondensation reactions.

As a result, it becomes possible, through reduction in the quantity of organic sulfonic acids used, to reduce the quantity of sulfur remaining in the silicones and to prevent the yellow-coloring caused by ultraviolet rays, without lowering in the polymerization degree of polyorganosiloxanes obtained. It is therefore possible to obtain excellent products.

As described hereinabove, silicone emulsions produced in accordance with the process of the present invention are capable of providing high quality products when applied to glazing agents, treating materials for textiles, carpets, cloth-coverings, etc., cosmetics for hair and skin, or the like, and hence the process of the present invention can be highly significant in industry.

We claim:

1. A process for producing polyorganosiloxanes, which comprises emulsion polymerizing in an aqueous medium and in the presence of an organic sulfonic acid and a trihalogenated acetic acid an organosiloxane having a structural unit represented by the following general formula:

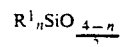

in which $R^1$ represents a substituted or unsubstituted monovalent organic group; and n represents an integer of 0 to 3.

2. A process for producing polyorganosiloxanes as defined in claim 1, wherein said organic sulfonic acid is a member selected from the group consisting of benzenesulfonic acids substituted with an aliphatic group, naphthalensulfonic acid substituted with an aliphatic group, aliphatic sulfonic acids, silylalkylsulfonic acids and diphenyl ether sulfonic acids substituted with an aliphatic group, the aliphatic groups contained therein having a carbon chain of 6 to 8 atoms.

3. A process for producing polyorganosiloxanes as defined in claim 1, wherein said trihalogenated acetic acid is a member selected from the group consisting of trifluoroacetic acid, trichloroacetic acid and tribromoacetic acid.

4. A process for producing polyorganosiloxanes as defined in claim 1, wherein said organic sulfonic acid is dodecylbenzensulfonic acid.

5. A process for producing polyorganosiloxanes as defined in claim 1, wherein said trihalogenated acetic acid is a member selected from the group consisting of trifluoroacetic acid and trichloroacetic acid.

* * * * *